(12) United States Patent
Yamauchi et al.

(10) Patent No.: US 8,456,722 B2
(45) Date of Patent: Jun. 4, 2013

(54) FORGERY PREVENTION MEDIUM WITH A VOLUME HOLOGRAM LAYER AND INFORMATION LAYER IN DIFFERENT COLORS

(75) Inventors: Tsuyoshi Yamauchi, Shinjuku-ku (JP); Mitsuru Kitamura, Shinjuku-ku (JP); Makio Kurashige, Shinjuku-ku (JP); Tomoki Yasuda, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 485 days.

(21) Appl. No.: 12/768,277

(22) Filed: Apr. 27, 2010

(65) Prior Publication Data

US 2010/0271674 A1    Oct. 28, 2010

(30) Foreign Application Priority Data

Apr. 27, 2009  (JP) .................................. 2009-107620

(51) Int. Cl.
*G03H 1/00* (2006.01)
(52) U.S. Cl.
USPC .................................... 359/2; 359/32; 283/86
(58) Field of Classification Search
None
See application file for complete search history.

(56) References Cited

U.S. PATENT DOCUMENTS

| 7,551,750 | B2 * | 6/2009 | D'Amato et al. ............. 382/100 |
| 2008/0149713 | A1 * | 6/2008 | Brundage ..................... 235/435 |

FOREIGN PATENT DOCUMENTS

| JP | 60-30948 | B2 | 5/1974 |
| JP | 62-133476 | A | 6/1987 |
| JP | 6-48075 | A | 2/1994 |
| JP | 10-145757 | A | 5/1998 |
| JP | 2004-268258 | A | 9/2004 |
| JP | 2007-304377 | A | 11/2007 |
| JP | 2008268776 | A * | 11/2008 |
| WO | 2005-006166 | A1 | 1/2005 |

* cited by examiner

*Primary Examiner* — Arnel C Lavarias
(74) *Attorney, Agent, or Firm* — Sughrue Mion, PLLC

(57) ABSTRACT

A forgery prevention medium includes a volume hologram layer on which an interference pattern is recorded after being exposed to an emitted laser beam; a digital watermarking information layer that can be interpreted by emitting a light beam with a predetermined wavelength; and an adherend that has the digital watermarking information layer and is attached to the volume hologram layer, wherein the information layer is of a different color from the volume hologram layer.

6 Claims, 8 Drawing Sheets

Reference example

FIG.3  Reference example
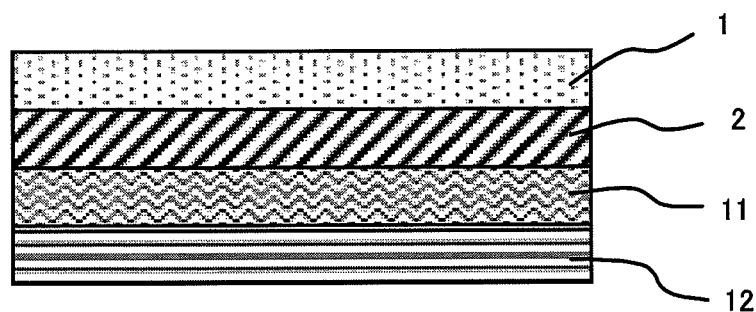
FIG.4  Reference example
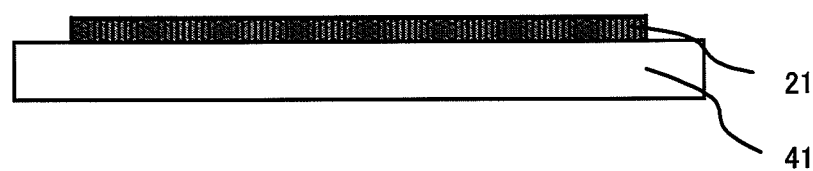

Reference example

Reference example

Reference example

US 8,456,722 B2

FORGERY PREVENTION MEDIUM WITH A VOLUME HOLOGRAM LAYER AND INFORMATION LAYER IN DIFFERENT COLORS

CROSS REFERENCE TO RELATED APPLICATIONS

This application claims benefit of Japanese Patent Application No. 2009-107620 filed in Japan on Apr. 27, 2009, the contents of which are incorporated by this reference.

BACKGROUND OF THE INVENTION

1. Technical Field

The present invention relates to a forgery prevention medium and particularly to a forgery prevention medium that makes use of a hologram applied for determining authenticity to prevent forgery.

2. Background Art

Various means of preventing forgery have been used for goods that need forgery prevention as well as authentication, such as cards including cash cards, credit cards and check cards, cash vouchers, identification papers, and important documents. For example, a rainbow hologram consisting of a relief hologram having a metallic reflective layer is provided as a structure for authentication on the surface of the credit card to allow a visual determination of the card's authenticity. A recording device for such a hologram is disclosed in JP-B-60-30948.

There is a technique for recording information on such a hologram, managing data, and verification. After the recording of hologram, printing is done on the surface of the hologram to record information on the hologram. As shown in FIGS. 12A to 12C, recorded as information are barcodes (FIG. 12A), two-dimensional barcodes (FIG. 12B), serial numbers (FIG. 12C), and the like. Although visual inspection may not lead to an understanding of the recorded information, it can be confirmed that some sort of information has been recorded. Since it is possible to visually confirm the presence of the information, the hologram can be forged by printing the same information even if the content of the information cannot be understood.

Therefore, a method of recording information with UV or IR emission ink would be used to make it impossible to visually confirm the recorded information.

Incidentally, techniques for printing information on holograms are disclosed in JP-A-62-133476, JP-A-2004-268258, and Jpn. PCT National Publication No. 2005-006166.

However, according to the conventional methods, when individual information is recorded, the recorded information could disturb and hurt the design of the hologram. A specific area on which the individual information is printed needs to be provided to keep the individual information from disturbing the design. However, the problem is that providing the specific area leads to an increase in the size of the hologram. The method of recording information with UV or IR emission ink can prevent the recorded information from disturbing the design of the hologram. However, there is a problem of increasing costs due to the necessity of selecting recording methods or materials to make it impossible to visually confirm the recorded information. Moreover, productivity is not good because the information needs to be positioned appropriately relative to the design.

SUMMARY OF THE INVENTION

A forgery prevention medium includes a volume hologram layer on which an interference pattern is recorded after being exposed to an emitted laser beam; an information layer on which digital watermarking information is recorded; and an adherend that has the information layer and is attached to the volume hologram layer, wherein the information layer is of a different color from the volume hologram layer.

Moreover, the information recorded on the information layer is interpreted by emitting a light beam that is different in one or more of the characteristics, incidence direction, incidence angle and incidence wavelength, from a hologram reproduction illumination beam used to reproduce an image recorded on the volume hologram layer.

The information layer is of a color complementary to the color of an image reproduced by the volume hologram layer.

Moreover, the brightness of the information layer is N7.0 or less in the JIS standard color chart.

An adhesive layer is provided to bond the volume hologram layer and the adherend together.

A heat seal layer is provided to thermally transfer the volume hologram layer to the adherend.

The digital watermarking information having a high level of secrecy is used for the hologram having a high level of reliability in terms of security. Therefore, the information is difficult to interpret by eye under normal conditions. Thus, it is possible to improve the effect of forgery prevention. Moreover, since the digital watermarking information having redundancies is used, it is possible to efficiently produce the forgery prevention medium without complicated processes such as alignment.

BRIEF DESCRIPTION OF THE DRAWINGS

FIG. 3 is a cross-sectional view of a hologram layer and other layers in a first reference example before being attached to an adherend.

FIG. 4 is a cross-sectional view of the adherend having a printing layer of the first reference example.

DESCRIPTION OF EXEMPLARY EMBODIMENTS

A forgery prevention medium of the present invention will be described hereinafter with reference to the accompanying drawings. The forgery prevention medium of the present invention includes a volume hologram layer 2 where interference patterns are recorded by the exposure to an emitted laser beam; and an information layer 22 where digital watermarking information is recorded. The forgery prevention medium also includes an adherend 41 that has the information layer 22 and is attached to the volume hologram layer 2.

Moreover, information recorded on the volume hologram layer 2 is interpreted by emitting a light beam that is different in one or more of the following characteristics from a hologram reproduction illumination beam used to reproduce information or images recorded on the volume hologram layer 2: incidence direction, incidence angle, and incidence wavelength.

Furthermore, what is recorded is the digital watermarking information that is difficult to interpret by eye but is possible for a dedicated reader to interpret. The digital watermarking information refers to information that is different from the design or pattern of hologram that is embedded in the hologram so as not to harm the characteristics of the hologram and is discernible to the eye. It is desirable that the digital watermarking information be the repeating-pattern information made by a predetermined algorithm. Incidentally, a method of inserting and reading digital watermarks is disclosed in JP-A-10-145757.

Figure 1:
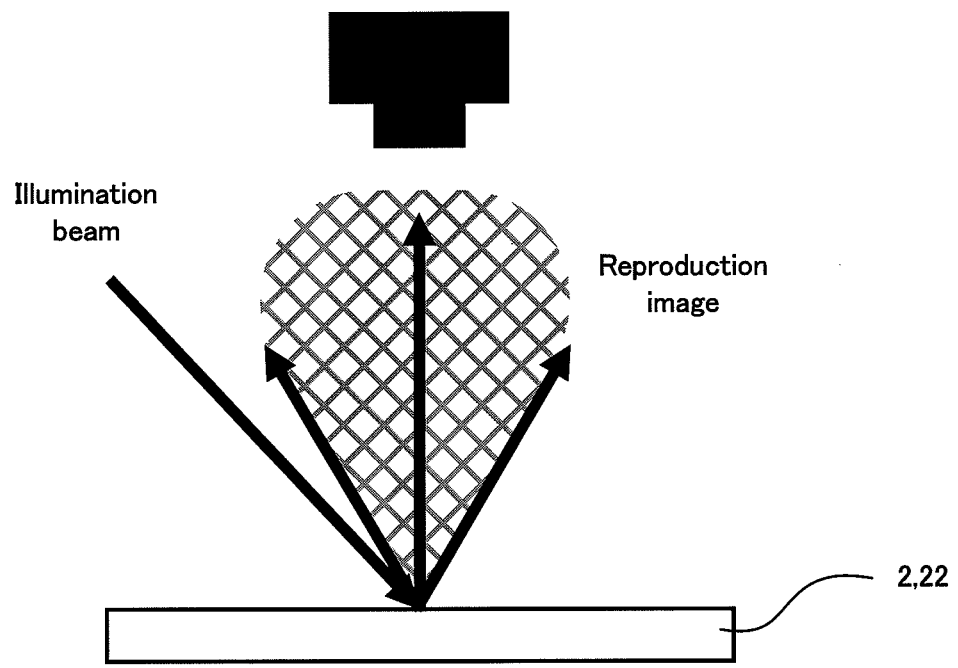
FIG. 1 is a diagram illustrating the observation of a reproduction image of a volume hologram layer of a forgery prevention medium.
Figure 2A:
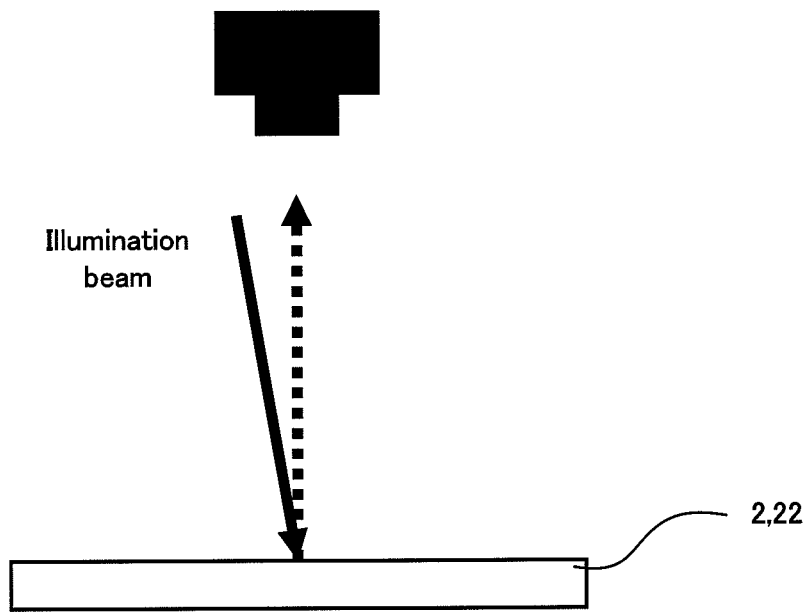
FIG. 2 is a diagram illustrating a case in which a reproduction image of a volume hologram layer of a forgery prevention medium is not observed.
Figure 2B:
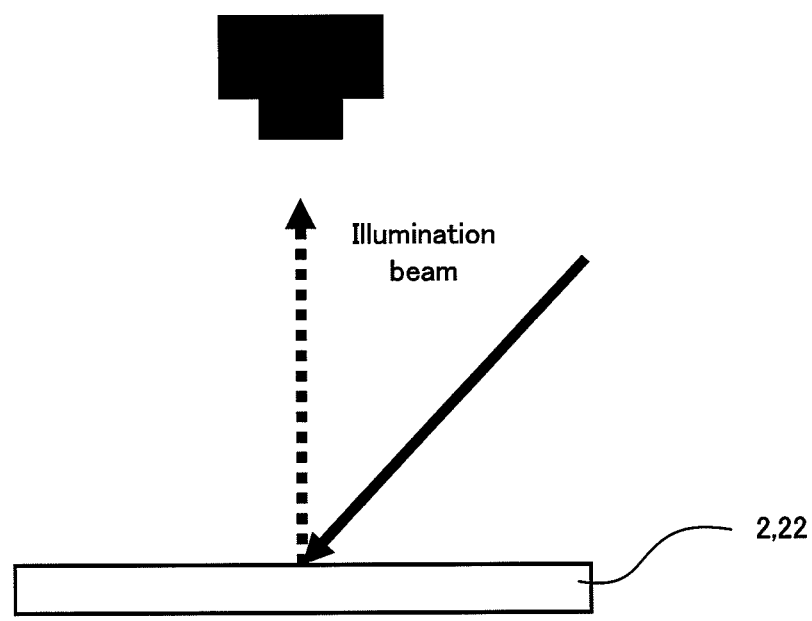

In the forgery prevention medium having the information layer 22 and the volume hologram layer 2, when a reproduction image of the volume hologram layer 2 is observed, an illumination beam entering at an angle designed to reproduce the image allows the observation of the reproduction image of the volume hologram layer 2 as shown in FIG. 1. As shown in FIG. 2, when the illumination beam enters at a different angle from the angle designed to reproduce the image, the reproduction image of the volume hologram layer 2 cannot be observed. In the case of Lippmann hologram, since the angular selectivity is high, the reproduction image of the volume hologram layer 2 is not reproduced when the incidence angle of the illumination beam is different from the designed one, making it easy to read only the information of the information layer 22. Moreover, since the wavelength selectivity is also high, the image is not reproduced if the wavelength is different even when the illumination beam enters at the angle designed to reproduce the reproduction image of the volume hologram layer 2, making it easy to read only the information of the information layer 22.

Figure 5:
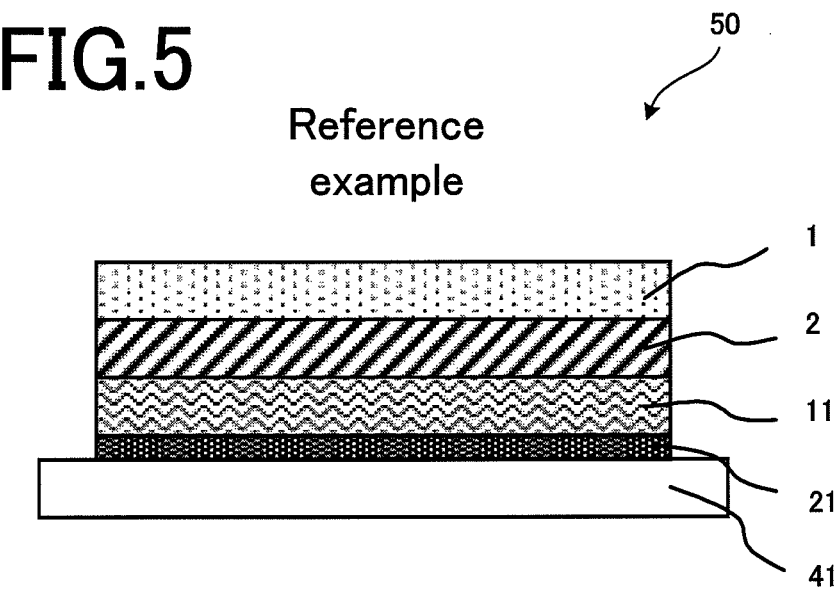
FIG. 5 is a cross-sectional view of a forgery prevention medium in the first reference example.

FIGS. 3, 4 and 5 are diagrams illustrating a first reference example of the forgery prevention medium. FIG. 3 is a cross-sectional view of a hologram layer and other layers of the first reference example before being attached to the adherend. FIG. 4 is a cross-sectional view of the adherend of the first reference example which has a printing layer. FIG. 5 is a cross-sectional view of the forgery prevention medium of the first reference example.

As shown in FIG. 3, in the first reference example, first off the volume hologram layer 2 is formed on a substrate film 1 that is a hologram substrate.

The substrate film 1 is not limited to a specific material as long as the substrate film 1 has a certain level of mechanical strength. For example, PET films or the like can be used. The thickness of the hologram substrate 1 usually falls in a range of 5 μm to 200 μm and preferably in a range of 10 μm to 50 μm.

To form the volume hologram layer 2, coating is applied to the surface of the substrate film 1 by a typical coating means such as spin coater and gravure coater and, when necessary, is dried. Conventional, publicly-known recording materials for volume holograms can be used as materials for the hologram. More specifically, the materials for example include silver halide photosensitive materials, dichromated gelatin, photo-crosslinked polymer, and photopolymer. In particular, compared with other materials, photopolymer enables the volume hologram to be produced only with dry process and is good in mass production. The photopolymer used for hologram materials includes at least one kind of photopolymerizable compound and a photoinitiator.

In the volume hologram, interference patterns are recorded and formed as a result of modulation of refractive indexes or transmissivity. When the volume hologram layer 2 is exposed to the emitted laser beam, the polymerization of the photo-polymerizable compound occurs and interference patterns are recorded. The laser beams used for holography exposure include argon ion laser beams (457.9 nm, 476.5 nm, 488.0 nm, and 514.5 nm), krypton ion laser beams (647.1 nm), helium-neon laser beams (632.8 nm), and YAG laser beams (532 nm).

Conventional, publicly-known methods can be used to record the interference patterns of the above image. For example, with an original plate firmly put on the volume hologram layer 2, interference exposure is conducted by using a visible light beam or an ionizing radiation, such as ultraviolet rays and electron beams, on the substrate film 1 to record the interference patterns of the image.

Moreover, in order to promote modulation of refractive indexes and complete the polymerization reaction of the photopolymerizable compound and the like, the exposure of the entire surface to ultraviolet rays, application of heat or other processes can be performed when needed after the interference exposure.

Then, label processing is performed to make the forgery prevention medium easy to use.

A label substrate 12 detaches when the forgery prevention medium 50 that is given information is attached to the adherend. The label substrate 12 is not limited to a specific material as long as the ease with which the label substrate 12 can detach from an adhesive layer 11 is at a moderate level and the label substrate 12 has a certain level of mechanical strength. The materials for example include transparent resin films such as PET films and polyvinyl chloride (PVC) films.

The thickness of the film used for the label substrate 12 is selected appropriately according to usage and type of the label and the like. The thickness of the film usually falls in a range of 2 μm to 200 μm and preferably in a range of 10 μm to 100 μm.

When being processed into a label, the adhesive layer 11 is to cause the forgery prevention medium 50 to adhere to the adherend. The adhesive layer 11 is obtained by using, for example, acrylate resin, acrylic ester resin, copolymer of the acrylate resin or acrylic ester resin, styrene-butadiene copolymer, natural rubber, casein, gelatin, rosin ester, terpene resin, phenolic resin, styrene resin, chroman-indene resin, polyvinyl ether, silicon resin, and the like; also used are α-cyanoacrylate-based, silicon-based, maleimide-based, styrol-based, polyolefin-based, resorcinol-based, and polyvinyl ether-based adhesives. It is preferable that the thickness of the adhesive layer 11 is within a range of 4 μm to 30 μm.

Subsequently, as shown in FIG. 4, a printing layer 21 is formed. According to the present reference example's method of producing the forgery prevention medium, the printing layer 21 is formed on the adherend 41.

As shown in FIG. 5, the volume hologram layer 2 is stacked on the adherend 41 on which the printing layer 21 is formed. According to the present reference example's method of producing the forgery prevention medium, the label substrate 12 is detached and the volume hologram layer 2 is attached by the adhesive layer 11 to the adherend 41.

The color of the printing layer 21 corresponding to where the present reference example's volume hologram layer 2 is attached is preferably complementary to the color of the hologram reproduction image in order to improve visibility of the hologram. N7.0 (brightness) or less in the JIS standard color chart is desirable. N6.0 (brightness) or less is more desirable.

Described below is a forgery prevention medium 50 that employs a heat seal layer 16 when the volume hologram layer 2 that is given the information layer 22 made of digital watermarking information is processed into transfer foil.

The heat seal layer 16 is a layer used to bond the volume hologram layer that is given digital watermarking information and an adherend together through heating and the like after the volume hologram layer is firmly put on the adherend when the volume hologram layer 2 that is given digital watermarking information is thermally transferred to the adherend.

For such an heat-sensitive adhesive layer, for example, thermoplastic resin such as ethylene vinyl acetate copolymer (EVA), polyamide resin, polyester resin and polyethylene resin may be used. Out of the above resins, a layer that allows heat sealing at 180 degrees Celsius or below is preferable. It is further preferable that the one whose acetic acid content of the ethylene vinyl acetate copolymer (EVA) is greater than or equal to 25 percent be used. Moreover, for the above resin, the heat-sensitive adhesive layer may be colored when necessary.

Figure 6:
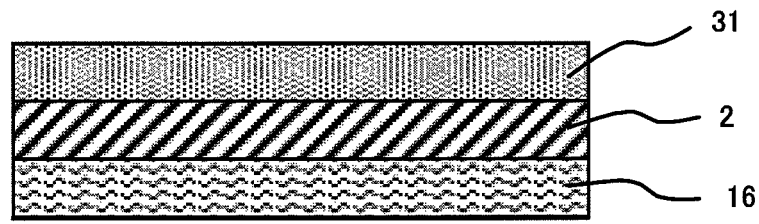
FIG. 6 is a cross-sectional view of a hologram layer and other layers in a second reference example before being attached to an adherend.
Figure 7:
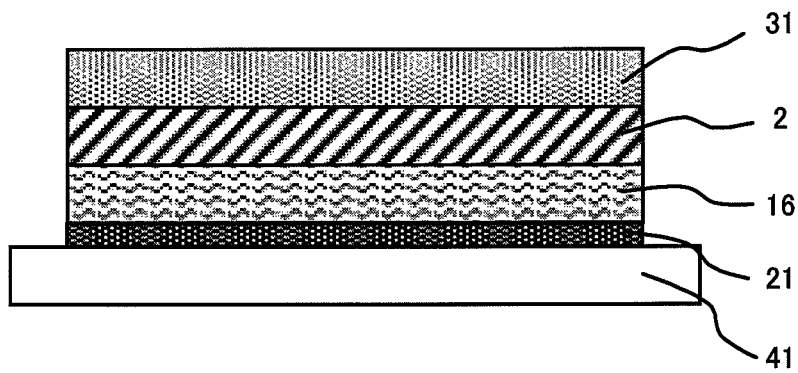
FIG. 7 is a cross-sectional view of a forgery prevention medium in the second reference example.

FIGS. 6 and 7 are diagrams illustrating a forgery prevention medium in a second reference example. FIG. 6 is a cross-sectional view of a hologram layer and other layers before a transfer to an adherend. FIG. 7 is a cross-sectional view of the forgery prevention medium in the second reference example.

As shown in FIG. 6, in the second reference example, first off the volume hologram layer 2 is formed on a protective layer 31.

Subsequently, the heat seal layer 16 is formed on the volume hologram layer 2 protected by the protective layer 31.

As shown in FIG. 4, the printing layer 21 is then formed in a similar way to in the first reference example. According to the present reference example's method of producing the forgery prevention medium, the printing layer 21 is formed on the adherend 41.

Subsequently, as shown in FIG. 7, the volume hologram layer 2 is stacked on the adherend 41 on which the printing layer 21 is formed. According to the present reference example's method of producing the forgery prevention medium, with the volume hologram layer 2 firmly put on the adherend 41, the volume hologram layer 2 and the adherend 41 are heated; the volume hologram layer 2 that is given digital watermarking information and the adherend 41 are bonded together by the heat seal layer 16.

The color of the printing layer 21 corresponding to the transfer position of the present reference example's volume hologram layer 2 is preferably different from the color of the hologram reproduction image in order to improve visibility of the hologram. In particular, it is more preferable that the color of the printing layer 21 corresponding to the transfer position of the present reference example's volume hologram layer 2 be complementary to the color of the hologram reproduction image. N7.0 (brightness) or less in the JIS standard color chart is desirable. N6.0 (brightness) or less is more desirable.

The following describes a first embodiment of the present invention.

Figure 8:
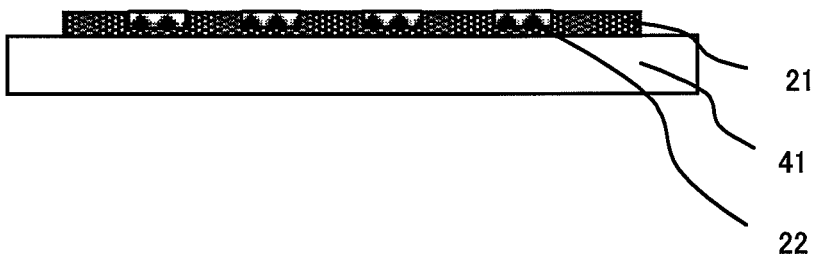
FIG. 8 is a cross-sectional view of an adherend having a printing layer that is given digital watermarking information according to a first embodiment of the present invention.
Figure 9:
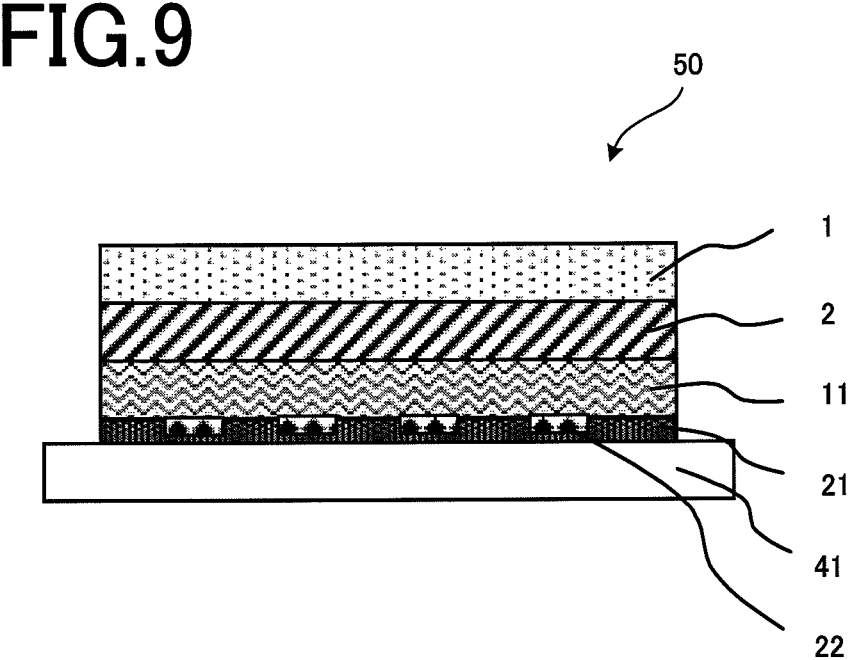
FIG. 9 is a cross-sectional view of a forgery prevention medium that is given digital watermarking information according to the first embodiment.

FIG. 8 is a cross-sectional view of an adherend having a printing layer and an information layer according to the first embodiment. FIG. 9 is a diagram illustrating a forgery prevention medium of the first embodiment i.e. a cross-sectional view of the forgery prevention medium that is given digital watermarking information according to the first embodiment.

According to the first embodiment, in a similar way to in the first reference example, as shown in FIG. 3, first off the volume hologram layer 2 is formed on the substrate film 1 that is a hologram substrate. After that, label processing is performed to make the forgery prevention medium easy to use. The label processing is the same as in the first reference example.

Subsequently, as shown in FIG. 8, the printing layer 21 and the information layer 22 made of digital watermarking information are formed. According to the present embodiment's method of producing the forgery prevention medium, the printing layer 21 and the information layer 22 are formed on the adherend 41.

Then, as shown in FIG. 9, the volume hologram layer 2 is stacked on the adherend 41 on which the printing layer 21 and the information layer 22 are formed. According to the present embodiment's method of producing the forgery prevention medium, the label substrate 12 is detached and the volume hologram layer 2 is attached by the adhesive layer 11 to the adherend 41.

Since the information layer 22 does not border on the surface, alteration can be prevented. Moreover, the information layer 22 is rarely affected by scratches and stains.

The color of the printing layer 21 and information layer 22 corresponding to where the present embodiment's volume hologram layer 2 is attached is preferably different from the color of the hologram reproduction image in order to improve visibility of the hologram. In particular, it is preferable that the color of the printing layer 21 and information layer 22 corresponding to where the present embodiment's volume hologram layer 2 is attached be complementary to the color of the hologram reproduction image. N7.0 (brightness) or less in the JIS standard color chart is desirable. N6.0 (brightness) or less is more desirable. It is preferable that the information layer 22 has redundancies.

Since the layer of a different color from the color of the hologram reproduction image is disposed below the hologram layer, the visibility of the reproduction image improves. Moreover, what is used is a complementary color, not similar colors, to increase the difference in hue between the reproduction image and the information layer, leading to an improvement in the visibility of the reproduction image. Since N7.0 or less (strong colors) is used, it is possible to increase the difference in brightness between the reproduction image and the information layer and therefore to improve the visibility of the reproduction image.

Figure 10:
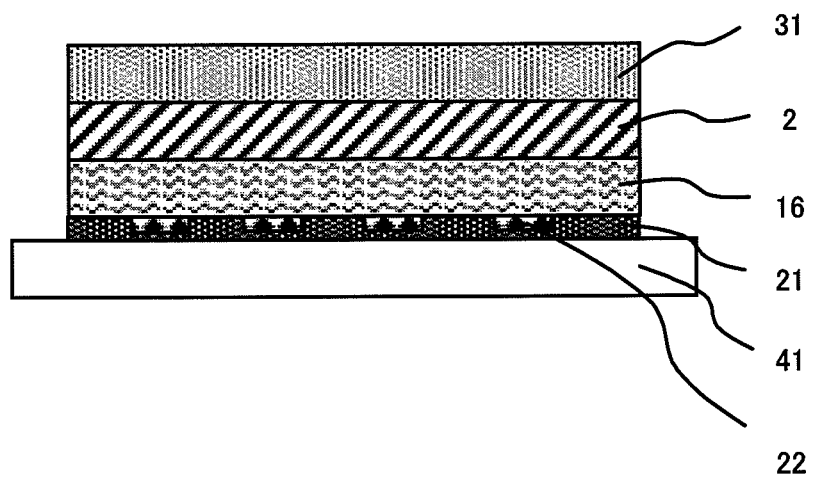
FIG. 10 is a cross-sectional view of a forgery prevention medium that is given digital watermarking information according to a second embodiment of the present invention.

FIG. 10 is a diagram illustrating a forgery prevention medium according to a second embodiment of the present invention i.e. a cross-sectional view of the forgery prevention medium of the second embodiment that is given digital watermarking information.

According to the second embodiment, in a similar way to in the second reference example, as shown in FIG. 6, the volume hologram layer 2 is formed on the protective layer 31.

Subsequently, in a similar way to in the first embodiment, as shown in FIG. 8, the printing layer 21 and the information layer 22 made of digital watermarking information are formed. According to the present embodiment's method of producing the forgery prevention medium, the printing layer 21 and the information layer 22 are formed on the adherend 41.

Then, as shown in FIG. 10, the volume hologram layer 2 is stacked on the adherend 41 on which the printing layer 21 and the information layer 22 are formed. According to the present embodiment's method of producing the forgery prevention medium, with the volume hologram layer 2 firmly put on the adherend 41, the volume hologram layer 2 and the adherend 41 are heated; the volume hologram layer 2 that is given digital watermarking information and the adherend 41 are bonded together by the heat seal layer 16.

Since the information layer 22 does not border on the surface, alteration can be prevented. Moreover, the information layer 22 is rarely affected by scratches and stains.

The color of the printing layer 21 and information layer 22 corresponding to where the present embodiment's volume hologram layer 2 is attached is preferably different from the color of the hologram reproduction image in order to improve visibility of the hologram. In particular, it is preferable that the color of the printing layer 21 and information layer 22 corresponding to where the present embodiment's volume hologram layer 2 is attached be complementary to the color of the hologram reproduction image. N7.0 (brightness) or less in the JIS standard color chart is desirable. N6.0 (brightness) or less is more desirable. It is preferable that the information layer 22 have redundancies.

Since the layer of a different color from the color of the hologram reproduction image is disposed below the hologram layer, the visibility of the reproduction image improves. Moreover, what is used is a complementary color, not similar colors, to increase the difference in hue between the reproduction image and the information layer, leading to an improvement in the visibility of the reproduction image. Since N7.0 (brightness) or less (strong colors) is used, it is possible to increase the difference in brightness between the reproduction image and the information layer and therefore to improve the visibility of the reproduction image.

Described below is an embodiment of the present invention by which digital watermarking information is recorded by laser marking.

Figure 11:
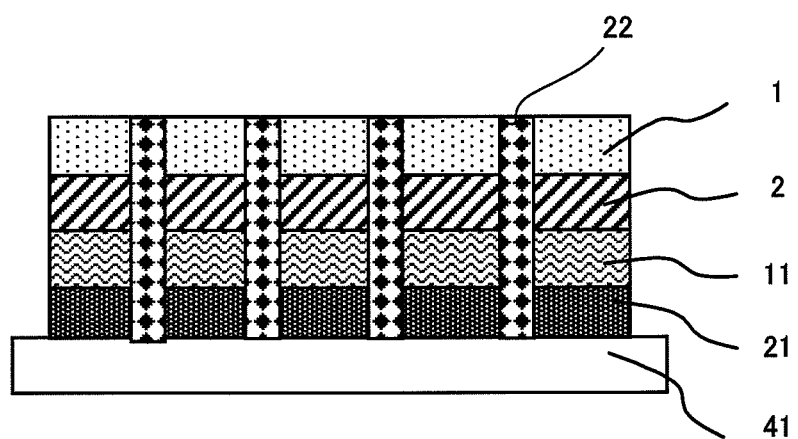
FIG. 11 is a cross-sectional view of a forgery prevention medium that is given digital watermarking information according to a third embodiment of the present invention.
Figure 12A:
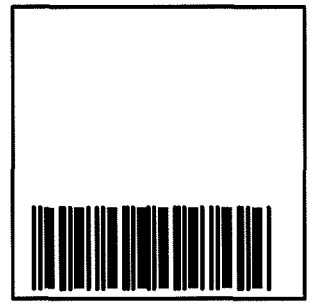
FIG. 12 is a plane view of a conventional forgery prevention medium.
Figure 12B:
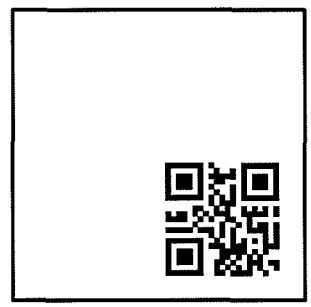
Figure 12C:
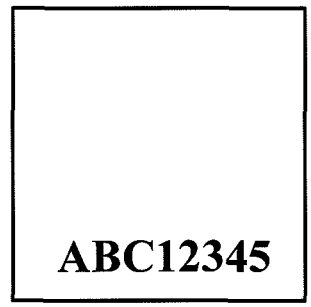

FIG. 11 is a cross-sectional view of a forgery prevention medium that is given digital watermarking information according to a third embodiment of the present invention.

According to the third embodiment, as shown in FIG. 11, in a hologram having a similar layer configuration to that of the first embodiment illustrated in FIG. 9, after the hologram is made, laser marking is carried out to record the information layer 22 made of digital watermarking information. In this case, the information layer 22 is recorded by engraving not only the printing layer 21 but also the substrate film 1, the hologram layer 2 and the adhesive layer 11.

According to the present embodiments, the digital watermarking information having a high level of secrecy is used for the hologram having a high level of reliability in terms of security and a high visibility. Therefore, the information is difficult to interpret by eye under normal conditions. Thus, it is possible to improve the effect of forgery prevention. Moreover, since the digital watermarking information having redundancies is used, it is possible to efficiently produce the forgery prevention medium without complicated processes such as alignment. Furthermore, since the digital watermarking information is covered with the other layers and does not border on the surface, the digital watermarking information is rarely damaged or removed.

The above has described the hologram and hologram production method of the present invention on the bases of the embodiments. However, the present invention is not limited to the embodiments; various modifications may be made.

What is claimed is:

1. A forgery prevention medium comprising:
a volume hologram layer on which an interference pattern is recorded after being exposed to an emitted laser beam;
an information layer on which digital watermarking information is recorded; and
an adherend that has the information layer and is attached to the volume hologram layer, wherein
the information layer is of a different color from the volume hologram layer.

2. The forgery prevention medium according to claim 1, wherein
the information recorded on the information layer is interpreted by emitting a light beam that is different in one or more of characteristics, incidence direction, incidence angle and incidence wavelength, from a hologram reproduction illumination beam used to reproduce an image recorded on the volume hologram layer.

3. The forgery prevention medium according to claim 1, wherein the information layer is of a color complementary to a color of an image reproduced by the volume hologram layer.

4. The forgery prevention medium according to claim 1, wherein a brightness of the information layer is N7.0 or less in a Japanese industrial Standards (JIS) standard color chart.

5. The forgery prevention medium according to claim 1, wherein an adhesive layer is provided to bond the volume hologram layer and the adherend together.

6. The forgery prevention medium according to claim 1, wherein a heat seal layer is provided to thermally transfer the volume hologram layer to the adherend.

* * * * *